July 12, 1955

F. VAVRA 2,712,783

DIRT GUARD CONTROL DEVICE

Filed March 20, 1952

Frank Vavra
INVENTOR.

BY *Clarence A. O'Brien
and Harvey B. Jackson*
Attorneys

United States Patent Office 2,712,783
Patented July 12, 1955

2,712,783
DIRT GUARD CONTROL DEVICE
Frank Vavra, Rising City, Nebr.
Application March 20, 1952, Serial No. 277,564
5 Claims. (Cl. 97—188)

This invention relates in general to a dirt guard control device, and more specifically to means for raising and lowering guards carried by cultivators for preventing dirt to be piled on plants during the cultivating operation.

In conventional use, cultivators are especially designed for cultivating rows of plants, and such cultivators are provided with guards which slide along the ground and enclose the plants during the cultivating operation whereby dirt is prevented from being piled onto the plants. In the cultivators of this type now on the market the guards for protecting the plants are provided with lift means mounted on the rear portion of the cultivator whereby the operator of a tractor drawing the cultivator is required to dismount the tractor and go around to the rear of the cultivator and pull actuating levers for lifting the guards. Such a procedure is obviously time consuming and it is desirable that the guards could be raised or lowered while the operator remains seated on the tractor.

The primary object of this invention is to provide means for attachment to a cultivator for raising and lowering guards carried at the rear of the cultivator, whereby the raising and lowering of the guards may be controlled by an operator of a tractor while remaining seated on the tractor.

Another object of this invention is to provide a conventional cultivator for cultivating small plants with an actuating lever mounted on the forward end of the cultivator's frame whereby guards for protecting plants during the cultivating operation, may be raised or lowered from the tractor.

Another object of this invention is to provide linkage for raising and lowering guards for protecting plants, normally mounted at the rear of the cultivator, whereby both guards may be raised simultaneously.

Another object of this invention is to provide an improved linkage for raising and lowering plant guards carried at the rear of cultivators, said linkage being of simple and compact construction whereby it may be economically manufactured.

A further object of this invention is to provide an improved linkage construction for attachment to a cultivator whereby guards for protecting plants from dirt piling thereon during the operation of the cultivator, may be raised and lowered by an operator of a pulling tractor while the operator remains seated on the tractor, said linkage structure being adapted to be mounted on the cultivator without modifying the cultivator's structure.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of the specification, and in which:

Figure 2:
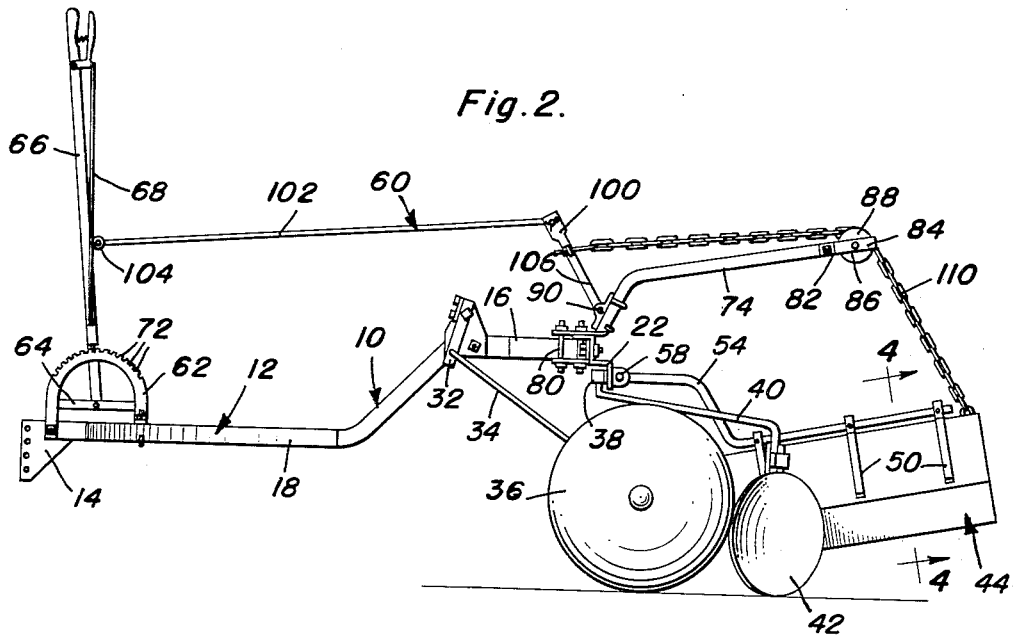
Figure 2 is a side elevational view of the cultivator of Figure 1 and shows the arrangement of the various elements of the cultivator and the linkage for raising and lowering the plant guards.
Figure 3:
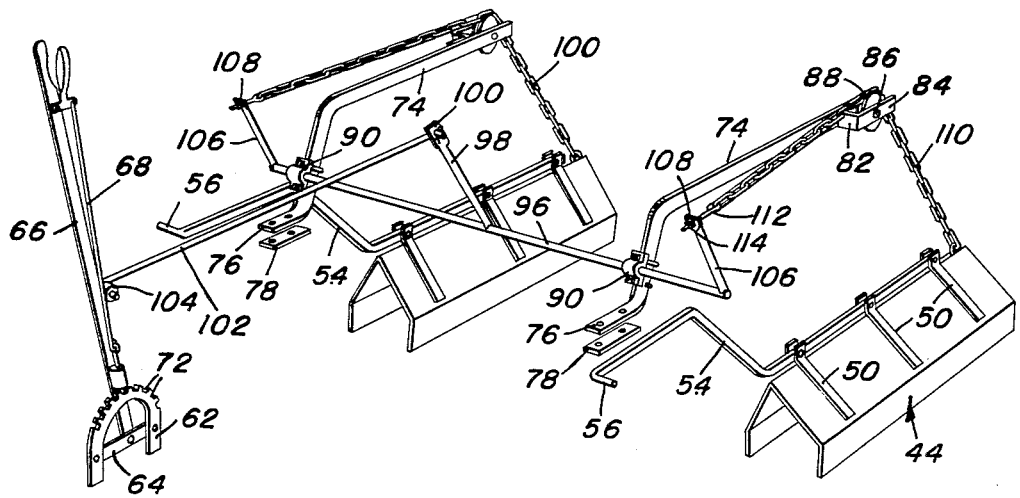
Figure 3 is a perspective view of the linkage for raising and lowering the plant guards, and includes the plant guards, the linkage being illustrated exactly as if it existed on a cultivator.

Figure 4 is a transverse vertical sectional view taken substantially upon the plane indicated by the section line 4—4 of Figure 2 and showing the general construction of one of the plant guards; and, Figure 5 is an enlarged fragmentary view of a portion of the linkage for raising and lowering the plant guards, and shows the manner in which pillow blocks are secured to rearwardly extending arms of the linkage, said pillow blocks being provided for the rotatable mounting of a transversely extending rod, the rod being also a portion of the linkage for raising and lowering the plant guards.

Similar characters of reference designate similar or identical elements and portions throughout the specification and throughout the different views of the drawings.

Figure 1:
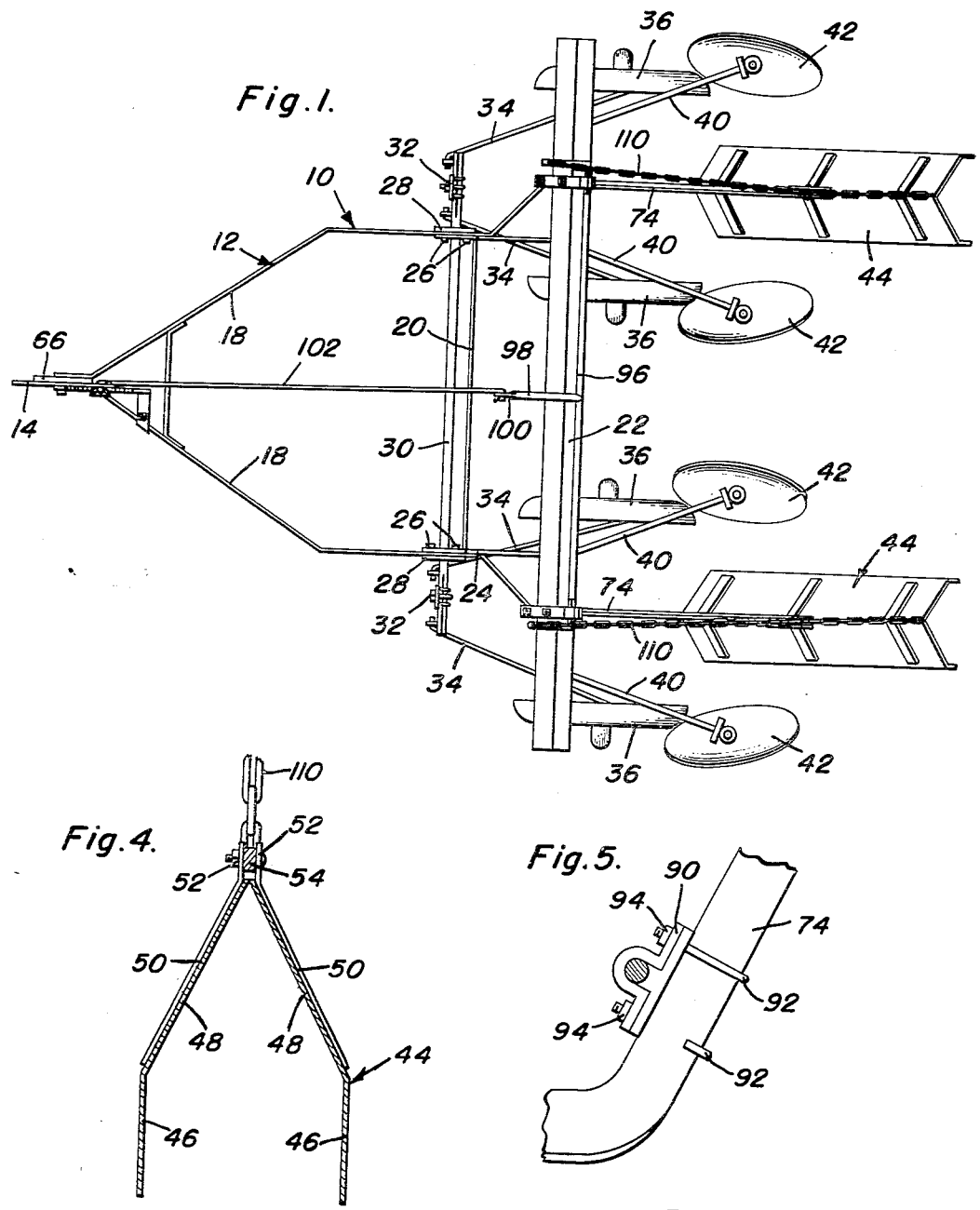
Figure 1 is a top plan view of a conventional cultivator for cultivating small plants, the cultivator having mounted thereon the improved linkage for raising and lowering guards for the plants.

Referring now to the drawings in detail, it will be seen that there is illustrated in Figures 1 and 2 a conventional cultivator which will be referred to hereinafter by the reference numeral 10. The cultivator 10 includes a frame 12, which has converging side rails at the forward end thereof which have secured thereto at their extreme forward ends a hitch-plate 14. The rear portion of the frame 12 is offset upwardly and rearwardly to form a frame portion 16 which is in offset parallel relation to the forward portion of the frame. At the forward end of the offset portion 16 the side rails 18 of the frame 12 are connected together by transverse frame member 20. The side rails 18 extend rearwardly from their connection with the transverse frame member 20 and diverge outwardly, and are connected at their rear ends to a transverse beam 22.

The connection between the transverse frame member 20 and the side rails 18 includes a rearward extension 24 of the side rail, the rear end of the rearward extension 24 also being connected to the transverse beam 22. The bolts 26, which connect the transverse frame member 20 and the rearward extension 24 to the frame rails 18, also connect vertically extending plates 28 to the frame rails 18. Extending transversely of the frame 12 and rotatably journaled to the vertical plates 28 is a support rod 30 which has adjustable mounting brackets 32 adjustably mounted on the ends thereof. Carried by the adjustable mounting brackets 32 and extending rearwardly therefrom are generally Z-shaped axles 34 on which are mounted ground engaging wheels 36 for supporting the cultivator 10 at the desired height from the ground. While it has not been illustrated, it will be understood that the cultivator is provided with means for rotating said supporting shaft 30 whereby the height of the ground engaging wheels 36 with respect to the frame 12 of the cultivator 10 may be adjusted and retained in the adjusted position.

Referring now to Figure 2 in particular, it will be seen that a lower vertical flange of the transverse beam 22 is provided with a plurality of mounting brackets 38 in which are adjustably mounted rearwardly extending axle members 40. Mounted on the axle members 40 are conventional cultivator discs 42. The cultivator discs 42 are mounted in pairs so as to work the ground adjacent each side of a row of plants.

The above recited structure of the cultivator 10 is conventional and is now being commercially produced.

In order that the cultivator 10 will not pile dirt on the small plants being cultivated thereby, the cultivator is provided with a guard for enclosing each row of plants as the cultivator discs 42 work the ground adjacent the plants. The guards are referred to by the reference numeral 44 and are conventional equipment. It will be noted that the forward ends of the guards 44 are in transverse alignment with the forward end of the cultivator discs and extend a substantial distance therebehind, whereby as the cultivator 10 moves forward the guards 44 slide along the ground and enclose the plants during the complete cultivating process.

Referring now to Figure 4 in particular, it will be seen that the plant guards 44 have lower spaced parallel sides 46 which are integral with the lower ends of upper inwardly sloping side portions 48 which are joined together at their upper ends. Welded, or otherwise secured to the upper side portions 48 are a plurality of straps 50 having spaced parallel upper flange ends 52. The upper flange ends 52 are bolted to a supporting arm 54 which extends therebetween. The support arm 54 is offset upwardly and forwardly and has an outturned end portion 56 which is rotatably mounted in a bracket 58 carried on the rear side of the lower vertical flange of the transverse beam 22. Due to the pivotal mounting of the support arm 54, it is obvious that the plant guard 44 will rest upon the ground and slide therealong as the cultivator 10 is moved forwardly.

The plant guards 44 are normally provided with means for raising and lowering same, said means being mounted on the transverse bar 22. However, in view of the distance between the seat of the tractor and the transverse beam 22 it is necessary that the operator of a tractor or other towing vehicle for the cultivator dismount from the vehicle and walk to the rear of the cultivator in order to raise or lower the plant guards 44. In order that the plant guards 44 may be raised and lowered while the operator is mounted on the towing vehicle, the cultivator 10 is provided with linkage structure for raising and lowering the plant guards 44, the linkage structure being the subject of this invention and referred to in general by the reference numeral 60.

The linkage structure 60 includes a sector rack 62 mounted on the forward ends of the side rails 18 of the frame. The sector rack 62 has a horizontal bar connecting the ends thereof, the bar being referred to by the reference numeral 64 and has pivotally secured thereto an actuating lever 66. The actuating lever 66 is provided with conventional latching means 68 for engaging the individual notches 72 of the sector rack 62 whereby the actuating lever 66 may be adjustably positioned with respect to the sector rack 62.

Mounted on the transverse beam 22 in vertical alignment with the plant guards 44 is a pair of rearwardly extending arms 74. Each of the rearwardly extending arms 74 has a horizontal mounting flange 76 engaging the upper side of the transverse beam 22 and a separate short flat plate 78 engaging the underside of the transverse beam 22. The horizontal mounting flange 76 and the flat plate 78 are secured together by conventional bolts 80.

The rear ends of the rearwardly extending arms 74 are provided with brackets 82 which have longitudinally extending arms 84 in spaced parallel relation to the ends of the rearwardly extending arms 74. A pin 86 extends between the arms 84 and 74 and has rotatably mounted thereon a pulley 88.

Mounted on the forward portions of the rearwardly extending arms 74 adjacent their horizontal mounting flanges 76 are pillow blocks 90. Referring to Figure 5, in particular, it will be seen that the pillow blocks 90 are each clamped to the rearwardly extending arms 74 by a pair of J-bolts 92 which have hook portions engaging under the lower edges of the rearwardly extending arms 74 and clamped thereto by nuts 94 on the upper ends thereof.

Rotatably journaled in the pillow blocks 90 and extending transversely of the cultivator 10 is a transverse rod 96. The transverse rod 96 is provided with a centrally located upwardly and forwardly sloping crank arm 98 having a flattened end 100. The flattened end 100 has pivotally connected thereto one end of a longitudinal rod 102 whose other end is pivotally connected to a bracket 104 mounted on the actuating lever 66. Due to the connection of the actuating lever 66 to the crank arm 98 by the longitudinal rod 102, it is obvious that the actuating lever 66 moves forwardly or rearwardly.

Secured to the ends of the transverse rod 96 are outer crank arms 106 which have flattened ends 108. It will be noted that the outer crank arms 106 are in a transverse plane passing through the crank arm 98. Entrained over the pulleys 88, carried by the rearwardly extending arms 74 are flexible members such as cable, chain, etc.

The flexible members are referred to in general by the reference numeral 110 and are secured at their rear ends to the rear upper portions of the plant guards 44. The forward ends of the flexible members 110 are secured to eye bolts 112 which are in turn adjustably secured to the flattened ends 108 of the outer crank arms 106 by nuts 114 threadedly engaged on the ends thereof.

When the outer crank arms 106 move forwardly in response to the forward movement of the crank arm 98, the flexible members 110 are also moved forwardly with the result that the rear ends thereof are moved upwardly and forwardly towards the pulleys 88 and the plant guards 44 are pivoted about the attached outturned end portions 56 which are rotatably journaled in the mounting brackets 58. Due to the placing of the actuating lever 66 at the forward end of the cultivator 10, the plant guards 44 may be raised and lowered through the movement of the flexible members 110.

The operation of this device will be understood from the foregoing description of the details thereof, taken in connection with the above recited objects and drawings. Further description would appear to be unnecessary.

Minor modifications of the device, varying in minor details from the embodiment of the device illustrated and described herein, may be resorted to without departure from the spirit and scope of this invention, as defined in the appended claims.

Having described the invention, what is claimed as new is:

1. In combination with a disc cultivator having a frame, ground engaging wheels carried by said frame, a transverse beam at the rear of said frame, disc cultivators mounted on said beam, plant guards positioned between said disc cultivators and pivotally connected to said beam, means for lifting said plant guards from their ground engaging position, said means including an actuating lever mounted on the forward end of the frame, a pair of rearwardly extending arms rigidly secured to said transverse beam in vertical alignment with said plant guards, a pulley mounted at the free end of each arm, a flexible member entrained on each pulley and connected to the rear of each of the plant guards, a transverse rod rockably mounted on said rearwardly extending arms, a central crank arm on said rod, means connecting said central crank arm to said actuating lever, other crank arms on the ends of said rod, said other crank arms being connected to the other ends of said flexible members.

2. In combination with a disc cultivator having a frame, ground engaging wheels carried by said frame, a transverse beam at the rear of said frame, disc cultivators mounted on said beam, plant guards positioned between said disc cultivators and pivotally connected to said beam, means for lifting said plant guards from their ground engaging position, said means including an actuating lever mounted on the forward end of the frame, a pair of rearwardly extending arms carried by said transverse beam, a transverse rod rockably mounted on said arms, an intermediate crank arm and outer crank arms rigid with said rod, first link means connecting said intermediate crank arm to said actuating lever, second means connecting the outer crank arms to said plant guards, whereby when said actuating lever is moved forwardly the plant guards are raised.

3. The implement of claim 2 wherein said first link means is a longitudinally extending rod pivotally connected to said actuating lever and to said intermediate crank arm, said intermediate crank arm being located centrally of said transverse rod.

4. The implement of claim 3 wherein said second means includes pulleys journaled at the ends of said arms, flexible members entrained over said pulleys and connected at opposite ends to said outer crank arms and to said plant guards.

5. The implement of claim 2 wherein said second means includes pulleys journaled at the ends of said arms, flexible members entrained over said pulleys and connected at opposite ends to said outer crank arms and to said plant guards.

References Cited in the file of this patent

UNITED STATES PATENTS

| | | |
|---|---|---|
| 974,325 | Williams | Nov. 1, 1910 |
| 1,433,249 | Trumbull | Oct. 24, 1922 |
| 1,610,975 | Schlattmann | Dec. 14, 1926 |
| 1,699,741 | Lampman | Jan. 22, 1929 |
| 2,220,338 | Koebel | Nov. 5, 1940 |